(12) United States Patent
Rubin et al.

(10) Patent No.: US 10,489,685 B1
(45) Date of Patent: *Nov. 26, 2019

(54) IMAGE DATA IDENTIFIERS AND VALIDATORS FOR DATA LOSS PREVENTION

(71) Applicant: Symantec Corporation, Mountain View, CA (US)

(72) Inventors: Sandler Rubin, San Carlos, CA (US); Ramzi Abi Antoun, San Francisco, CA (US); Jinyu Zuo, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/439,897

(22) Filed: Feb. 22, 2017

(51) Int. Cl.
*H04L 29/06* (2006.01)
*G06K 9/62* (2006.01)
*G06K 9/18* (2006.01)
*G06K 9/00* (2006.01)

(52) U.S. Cl.
CPC ....... *G06K 9/6267* (2013.01); *G06K 9/00268* (2013.01); *G06K 9/00442* (2013.01); *G06K 9/186* (2013.01); *G06K 9/6201* (2013.01); *H04L 63/10* (2013.01)

(58) Field of Classification Search
CPC ...................................... H04L 29/06
USPC ........................................... 726/4
See application file for complete search history.

(56) References Cited

U.S. PATENT DOCUMENTS

| | | | |
|---|---|---|---|
| 8,863,304 B1 | 10/2014 | Nagarkar et al. | |
| 8,867,741 B2 | 10/2014 | McCorkindale et al. | |
| 9,628,661 B2 | 4/2017 | Dolev | |
| 2007/0192630 A1 | 8/2007 | Crane et al. | |
| 2008/0002911 A1 | 1/2008 | Eisen et al. | |

(Continued)

OTHER PUBLICATIONS

International Search Report and Written Opinion for PCT/US2018/014890 dated Apr. 23, 2018, 7 pages.

*Primary Examiner* — Evans Desrosiers
(74) *Attorney, Agent, or Firm* — Patent Law Works LLP

(57) ABSTRACT

Techniques for data loss prevention in an image-specific domain using image data identifiers and validators are described. According to some embodiments, a method may include defining an image data identifier and a data identifier validator, the image data identifier specifying one or more prohibited object types, and the data identifier validator specifying one or more prohibited object sub-types. The method may include receiving an image, identifying one or more objects in the image based on attributes of the one or more objects, determining an object type of a first object of the one or more objects, and determining whether the object type of the first object matches at least one of the one or more prohibited object types. In some embodiments, the method may further include, in response to determining that the object type of the first object matches at least one of the one or more prohibited object types, determining whether an object sub-type of the first object matches at least one of the one or more prohibited object sub-types, and, in response to determining that the object sub-type of the first object matches the prohibited object sub-type, classifying the first object as prohibited.

20 Claims, 8 Drawing Sheets

(56) References Cited

U.S. PATENT DOCUMENTS

| | | | |
|---|---|---|---|
| 2013/0104199 A1* | 4/2013 | Sprunk | H04N 7/1675 |
| | | | 726/4 |
| 2014/0153830 A1 | 6/2014 | Amtrup et al. | |
| 2014/0233799 A1* | 8/2014 | Cho | G06K 9/00979 |
| | | | 382/103 |
| 2016/0246996 A1 | 8/2016 | Khoo et al. | |
| 2016/0335524 A1* | 11/2016 | Bremer | G06T 7/10 |
| 2016/0357732 A1 | 12/2016 | Hsu et al. | |
| 2016/0379184 A1 | 12/2016 | Smith et al. | |
| 2017/0221154 A1 | 8/2017 | Eftekhari et al. | |

* cited by examiner

IMAGE DATA IDENTIFIERS AND VALIDATORS FOR DATA LOSS PREVENTION

CROSS-REFERENCE TO RELATED APPLICATION

The present application is related to and incorporates by reference the entire contents of U.S. patent application Ser. No. 15/419,756, entitled, "Structured Text and Pattern Matching for Data Loss Prevention in Object-Specific Image Domain," filed on Jan. 30, 2017, and having the same assignee.

TECHNICAL FIELD

This disclosure pertains generally to computer security, and more specifically to automatically evaluating whether objects in an image may contain sensitive information.

BACKGROUND

The leakage of proprietary and/or confidential data is a continuing problem for organizations such as corporations, governments and universities. Contemporary ubiquitous remote network access to an organization's computers increases productivity and is convenient, but at the same time creates ever greater challenges for protecting the data from being accessed by unauthorized parties such as competitors or criminals. Leakage of enterprise data can result both from intentional activity by unscrupulous employees, as well as unintentional but negligent actions of employees not following robust security procedures Organizations lack visibility into the access and flow of sensitive documents and information. Administrators lack tools for tracking data access and usage. Tracking the access and flow of enterprise data and preventing leakage are more difficult than ever. Yet, organizations rightly want to limit the access and use of confidential data according to an enterprise-level information control policy.

Some technologies for tracking access and flow of enterprise data compare strings of text to a database of defined information or types of information. However, these technologies do not extend to circumstances where sensitive information is contained in an image.

Conventional DLP solutions have relied on traditional optical character recognition (OCR) technologies to determine whether an image contains sensitive information. However, OCR is not suitable for the high computational efficiency requirements of data loss prevention systems which may have to scan high volumes of data with minimal impact on transmission latency. Furthermore, conventional OCR technologies are limited in their ability to capture, process, and analyze complicated images. For instance, OCR technology ignores uniquely identifying image features, such as faces, logos, graphics, etc., and can easily be confused by image features such as these features and irregular text, thereby leading to unacceptable inefficiencies and false positives and/or false negatives. Lastly, OCR technology is very sensitive to external parameters such as illumination, perspective, noise and scale variations in the image.

Generic image classification technologies, such as automatic image tagging (e.g., used in image search tools) are also not suitable for the high computational efficiency and accuracy requirements of data loss prevention. In particular, generic image classification techniques may attempt to identify random objects based on their appearance, regardless of whether these objects contain personally identifiable information or not. For instance, a generic image classification engine may spend computational resources trying to detect whether an image contains a picture of an animal, or building, thus wasting time and resources in a way that is not beneficial for finding personally identifiable information.

It would be desirable to address these issues.

SUMMARY

A computing device may define an image data identifier. The image data identifier may specify one or more prohibited object types. A data identifier validator may be defined. The data identifier validator may specify one or more prohibited object sub-types.

An image may be received. One or more objects in the image may be identified based on attributes of the one or more objects. In some embodiments, the attributes of the one or more objects may comprise dimensions of the first object, MICR (Magnetic Ink Character Recognition) characters, an image of a face, or an image of the face at a defined location on the object. In some embodiments, the object type of the first object may comprise a photo identification card. An object type of a first object of the one or more objects may be determined. In some embodiments, an object type of a second object of the one or more objects may also be determined.

Whether the object type of the first object matches at least one of the one or more prohibited object types may be determined. In some embodiments, a level of confidence that the object type of the first object matches at least one of the one or more prohibited object types and whether the level of confidence that the object type of the first object matches at least one of the one or more prohibited object types satisfies a threshold level of confidence may be determined. In some embodiments, whether the object type of the second object matches at least one of the one or more prohibited object types may be determined.

In response to determining that the object type of the first object matches at least one of the one or more prohibited object types, whether an object sub-type of the first object matches at least one of the one or more prohibited object sub-types may be determined. In some embodiments, determining whether an object sub-type matches at least one of the one or more prohibited object sub-types is further in response to determining that a level of confidence that the object type of the first object matches at least one of the one or more prohibited object types does not satisfy a threshold level of confidence. In some embodiments, in response to determining that the object type of the second object matches at least one of the one or more prohibited object types, whether an object sub-type of the second object matches at least one of the one or more prohibited object sub-types may be determined. In some embodiments, the one or more prohibited object types may comprise a driver license and the one or more prohibited object sub-types may comprise a particular driver license issuing jurisdiction.

In response to determining that the object sub-type of the first object matches the prohibited object sub-type, the first object may be classified as prohibited. In some embodiments, in response to determining that the object sub-type of the second object matches the prohibited object sub-type the second object may be classified as prohibited. In some embodiments, that the image contains sensitive information based on the object type of the first object and the object type of the second object may be determined. In some embodiments, it may be determined that the image contains sensitive information responsive to the object type of the first object being a first particular object type and the object type of the second object being a second, different particular object type. In some embodiments, that the image contains sensitive information based on the object sub-type of the first object and the object sub-type of the second object may be determined.

In response to determining that the object type of the first object does not match at least one of the one or more prohibited object types or that the object sub-type of the first object does not match at least one of the one or more prohibited object sub-types, the first object may be classified as allowed.

In some embodiments, the image may be automatically blocked from being electronically transferred in response to the first object being classified as prohibited. In some embodiments, an electronic message may be automatically transmitted to an administrator in response to the first object being classified as prohibited.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
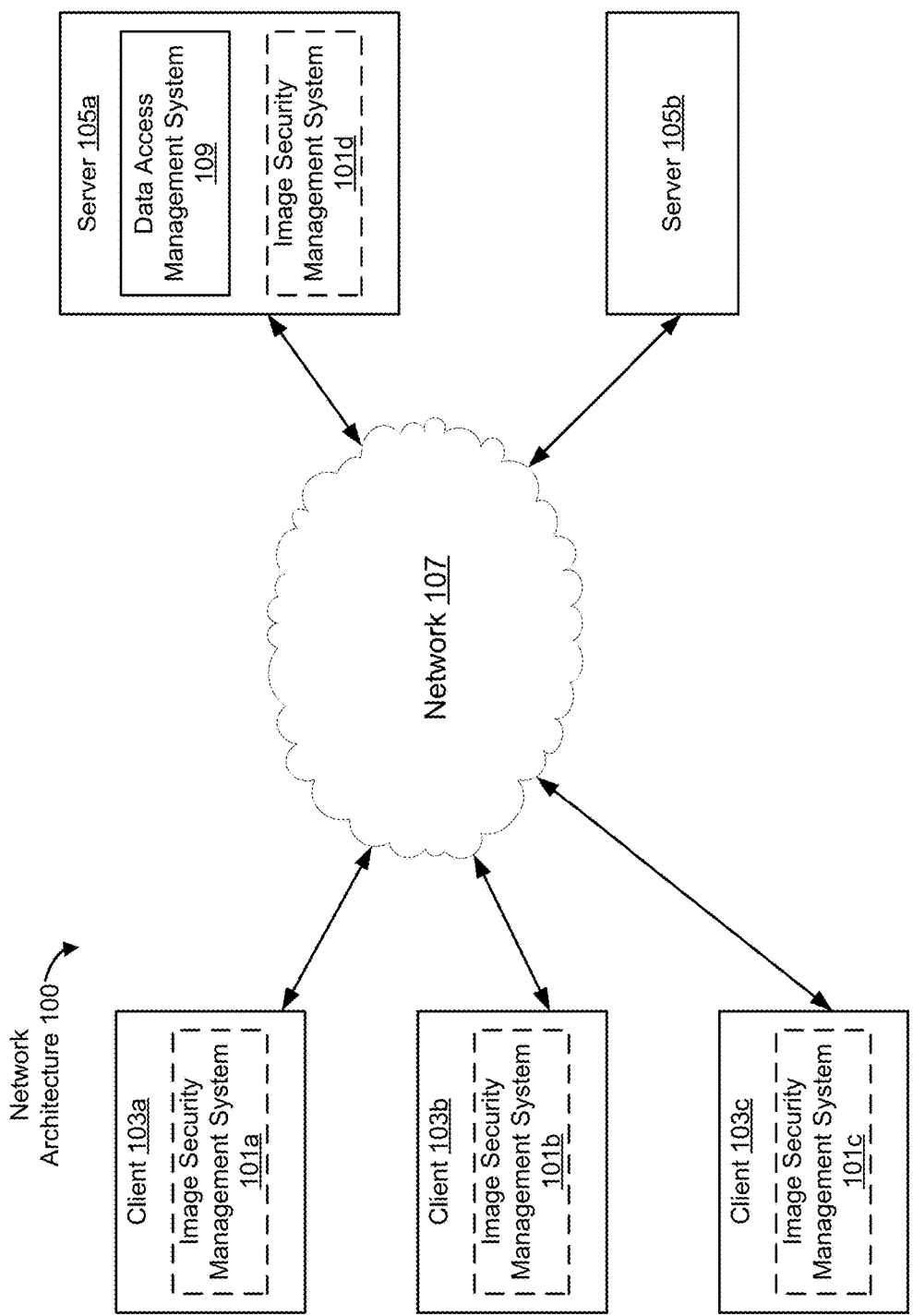
FIG. 1 is a block diagram of an exemplary network architecture in which image security management system can be implemented, according to some embodiments.

The figures depict various embodiments for purposes of illustration only. One skilled in the art will readily recognize from the following discussion that alternative embodiments of the structures and methods illustrated herein may be employed without departing from the principles described herein.

DESCRIPTION

An image security management system 101 is described herein that can perform data loss prevention in an image-specific domain using image data identifiers and validators. For example, the image security management system 101 can determine whether images contain sensitive information in violation of defined security policies.

The techniques described herein may provide an image-based data loss prevention (DLP) system or allow the functionality of an existing text-based DLP system to be extended to images. An example DLP system is described herein, for example, comprising the image security management system 101 and/or the data access management system 109. A DLP system may include certain rules or security policies that determine whether an image includes sensitive information (e.g., confidential information, personally identifiable information, etc.). A DLP system, such as is described herein, may scan thousands or millions of images in a very short time, so a low latency, cost, and false negative rate are particularly important in a DLP system.

The techniques described herein extend data identifiers to objects in the image domain, such as those that are not easily identified using text string patterns. For example, text-based data identifiers may search text for a uniquely identifiable textual pattern. A data identifier describes information that may be classified as sensitive data that may be prohibited, allowed, or restricted according to a security policy (a security policy may define a data security condition or rule). A data identifier may include a text-based data identifier, or analogously, an image data identifier, as described in further detail elsewhere herein.

In some embodiments, a textual data identifier may define a specific pattern of text for detection. For example, a textual data identifier may indicate to search for a credit card number, in which instance, the DLP system may search for a 16 digit number with defined attributes (e.g., that satisfies a Luhn check, a checksum, an algorithmic calculation, matches a number in a database, etc.). A DLP system may include predefined text-based data identifiers, which are commonly used and known text string patterns that let a system administrator create a security policy to protect sensitive data. For instance, an administrator may define a data security condition and text-based data identifier for a text pattern (e.g., a social security number, ABA routing number, credit card number, etc.) that will be triggered if a text string matching the text pattern is present in query text.

An image data identifier describes objects (e.g., object types), including those that may be difficult to describe using text strings. An image data identifier increases the expressiveness of a DLP policy language by allowing an administrator to define object types (e.g., a classification or genus of objects) that satisfy a data security condition when an appropriate object type is identified in an image file in violation of the data security condition. Text-based methods alone cannot identify the presence of objects in images nor can they identify the object types of the objects in images, for example, image data identifiers can describe objects that are difficult to identify using text strings, because different objects within a class or type may have limited or no common textual features (e.g., student photo identification cards or student IDs).

Accordingly, a set of image data identifiers can be defined for a DLP system that may cause the DLP system (e.g., the image security management system 101 and/or the data access management system 109) to look for particular types of objects inside of image files. For instance, one image data identifier might look for passports, while another image data identifier might look for social security cards. The image data identifiers allow a data security condition to be written that operates on an image level. Illustrative examples of object types include bank checks, driver licenses, state IDs, computer screenshots, bar codes, passports, social security cards, work badges, and military badges, among other potential object types.

In some embodiments, an image composition (e.g., number of objects, object proximity, etc.) rule may be defined a data security condition for an image data identifier, for example, a data security condition may be defined to block an image if it contains two separate objects (e.g., objects having prohibited object types and, in some instances, sub-types), such as a driver license and a bank check.

In some embodiments, the techniques described herein may include data identifier validators. A data identifier validator may specify an object sub-type (e.g., a further narrowing of an object type). For example, if an object type is a driver license, then an object sub-type may specify, for instance, driver licenses for California, driver licenses that expire next year, or driver licenses for females only, etc. A data identifier validator may be used to provide additional granularity over image data identifiers (e.g., narrow down matches of an image data identifier) and/or reduce false positives. The additional granularity can be used by object detectors (e.g., the object identification module 311 and/or object analysis module 313) to make them more efficient. For example, if it is not necessary to know which state a driver license is from, an object detector will not spend additional computer resources to determine the state (e.g., an object detector may determine only the object type and not the object sub-type). Accordingly, the granularity is inversely proportional to the computing resources used and can be set based on administrator preferences and security policies.

The techniques described herein may use computer vision techniques to evaluate whether an image contains sensitive information. For example, the techniques may include using robust computer vision object detectors to identify the presence, object type, and, in some instances, object sub-type of an object for data loss prevention. The techniques described herein are particularly beneficial as they are highly efficient at passing images with no sensitive information, identifying sensitive information in challenging images (e.g., with different objects, poor image quality, multiple object in an image, etc.), and processing an extremely large volume of data with little latency.

The techniques described herein overcome the limitations of current methods of analyzing images, such as scanning an entire image using optical character recognition (also referred to herein as OCR). For example, performing optical character recognition on an entire image would be computationally expensive and result in unacceptable latency, for example, in an enterprise level DLP system. Further, optical character recognition cannot effectively determine an object type of an object in an image when the image quality is poor (e.g., due to rotation, perspective, orientation, illumination, clarity, etc.) and when various different objects do not have common, easily recognizable, text.

If an image data validator rule is present, an OCR-based technique or similar technique can be used to transcribe the required text (e.g., for extracting the expiry date of a driver's license). This can be done efficiently since the computer vision techniques already determined the presence and location and boundary of the object, the system can target the OCR engine only on a specific region of the object. In the driver's license example, in order to extract the expiry date, for instance, the OCR can be targeted to a rectangular region of a given location, height and width based off a known offset of the photo of the subject's face for example. This will greatly improve the efficiency of text-transcribing engines (e.g., OCR) and can only be made possible with the object detection and understanding part achieved prior to extracting text.

Another example of using object-specific knowledge to improve the accuracy of the validation, if a certain prohibited object uses a special font or color scheme, detecting the presence of this particular object beforehand may enable the system to optimize text transcription for that particular object. For instance, if a driver license of a certain state uses a given font, an OCR engine can be initialized with that font to improve its accuracy and efficiency.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

It should be noted that the example objects types and sub-types (e.g., student IDs, bank checks, and drivers licenses, etc.), attributes, etc., described herein are provided as illustrative examples, and that the technology described herein may be applied to other suitable objects and corresponding attributes. For example, other examples of objects for which the techniques described herein can be used may include passports, social security cards, bank statements, tax documents, loan documents, or other objects that may contain confidential or personally identifiable information.

FIG. 1 is a block diagram illustrating an exemplary network architecture 100 in which an image security management system 101 can be implemented. The illustrated network architecture 100 comprises multiple clients 103a, 103b and 103c, as well as multiple servers 105a and 105b. In FIG. 1, a data access management system 109 is illustrated as residing on a server 105a, and an image security management system 101a, 101b, 101c, and/or 101d is illustrated as residing one or more of a client 103a, 103b, 103c, and a server 105a, respectively. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown), etc. Clients 103 can be in the form of computing devices, such as servers, desktop or laptop computers, tablet computers, smart phones, wearable devices, etc., which are computer systems 210 capable of connecting to a network 107 and running applications.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

The example network architecture 100 illustrated in FIG. 1 shows a computer network 107; an image security management system 101 operable on, for example, a client 103a, and a data access management system 109 operable on the server 105a. The client 103 may represent a computer system 210, for example, as described elsewhere herein. For example, the client 103 may include a desktop or laptop computer, tablet computer, smartphone, wearable device, camera, image scanner, printer, fax machine. For instance, the techniques described herein can prevent an image containing sensitive information from being saved or transmitted from a scanner, printer, camera, fax machine, laptop, etc., such as, in instances where the is operable on the scanner, printer, camera, fax machine, laptop, etc., or on a computer system attached thereto. The servers 105a and 105b may represent first and/or third party servers for implementing the technology described herein, for example. The image security management system 101 may represent an application or code operable on the client 103 for performing data loss prevention in an image-specific domain using image data identifiers and validators.

The image security management system 101 may include computer logic operable to receive or retrieve and process data from the clients 103 and/or other entities of the network architecture 100. The image security management system 101 may use the data from the clients 103, for example, to evaluate whether images contain sensitive information according to defined security policies. For instance, the image security management system 101 may, as described elsewhere herein, use computer vision to identify objects, object types, and, in some embodiments, object sub-types in images to determine if there is sensitive information in the images.

The data access management system 109 may include computer logic operable to receive or retrieve and process data from the clients 103 and/or other entities of the network architecture 100. The data access management system 109 may use the data from the clients 103, for example, to define and manage security policies (e.g., defining data security conditions/rules), text-based data identifiers, image data identifiers, data identifier validators, rules, or specific data, etc., that qualifies as sensitive information. For instance, the data access management system 109 may allow an administrator to manage access and flow of data among clients 103 and, in some instances, track the flow of sensitive information and notify the administrator or other stakeholder of access or transfer of data containing sensitive information in violation of defined policies. For example, the techniques described herein provide an enhanced set of data identifiers, including image data identifiers, which may function in a standalone DLP system or may be used to augment the features of an existing DLP system.

For example, an administrator may select, using a user interface on the data access management system 109 (or, in some embodiments, the image security management system 101), from a list of defined abstract object types in the image domain to define an image data identifier. The data security condition/rule can be enhanced to define more complex conditions, such as prohibiting a driver license and a bank check from being together in the same scanned image. Data identifier validators can be defined for image data identifiers to provide more granularity, prevent false positives (or, in some instances, false negatives), and allow tuning of computational efficiency (e.g., skipping additional computation/analysis if additional validation and/or granularity is not needed).

Figure 2:
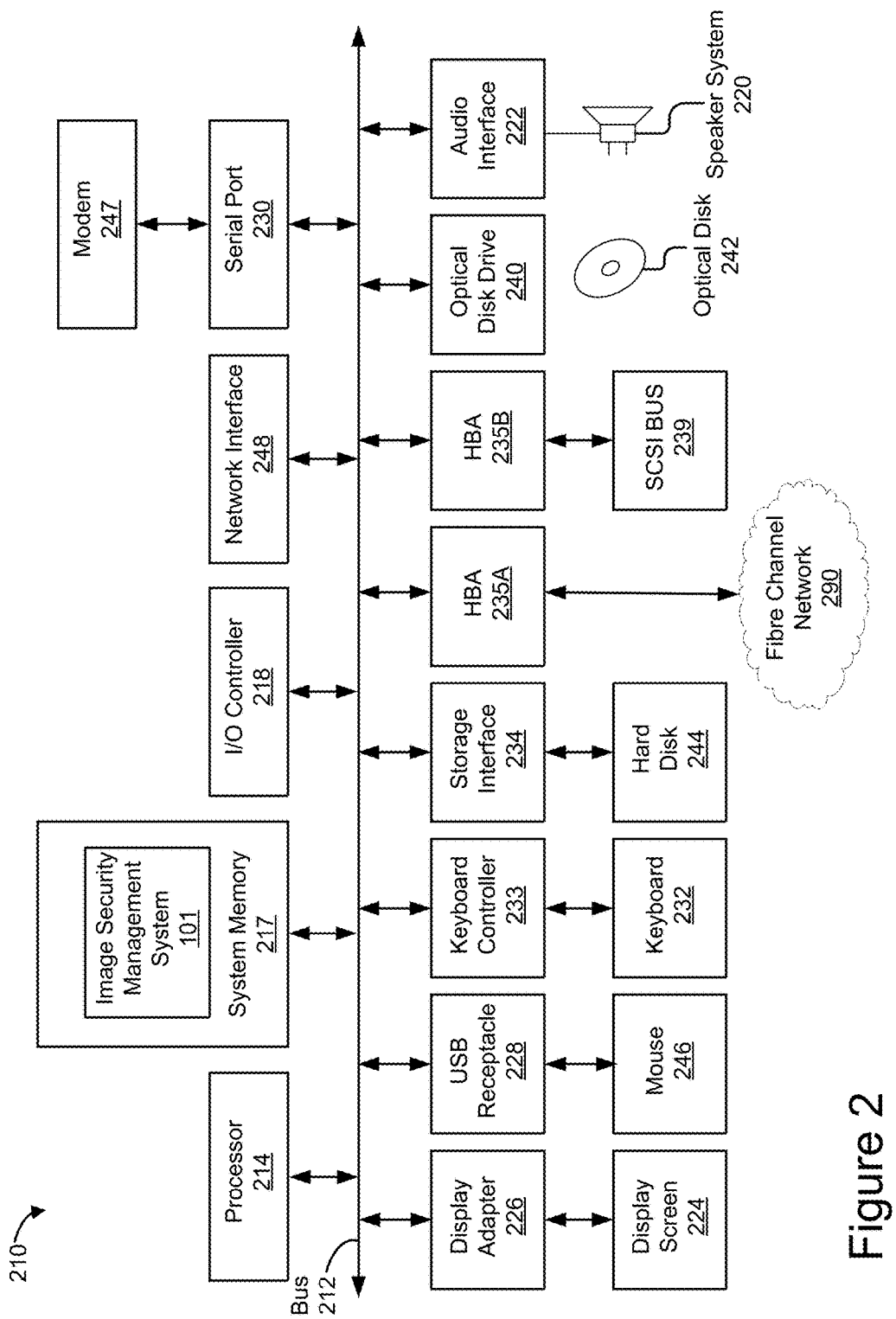
FIG. 2 is a block diagram of a computer system suitable for implementing an image security management system, according to some embodiments.

FIG. 2 is a block diagram of a computer system 210 suitable for implementing an image security management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 232 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above, may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs (e.g., in some instances, the image security management system 101, the data access management system 109, etc.) can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the image security management system 101 is illustrated as residing in system memory 217. The workings of the image security management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
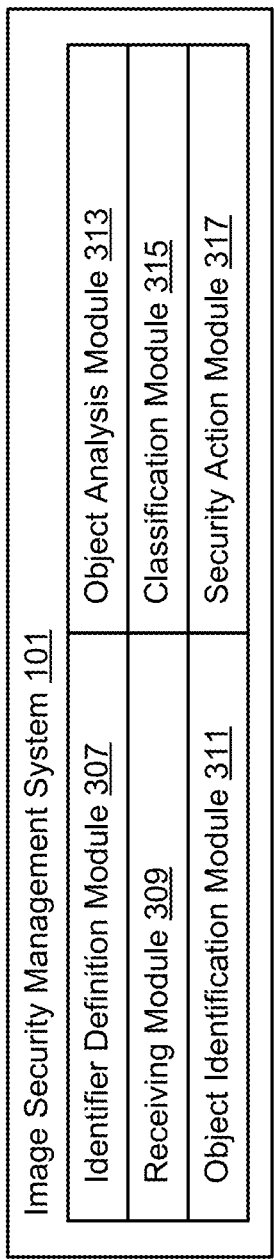
FIG. 3 is a block diagram of an image security management system, according to some embodiments.

FIG. 3 illustrates components of an image security management system 101, according to some embodiments. As described above, the functionalities of the image security management system 101 can reside on a server 105, a client 103, or be distributed between multiple computer systems 210, including within a cloud-based computing environment in which the functionality of the image security management system 101 is provided as a service over a network 107. It is to be understood that although the image security management system 101 is illustrated in FIG. 3 as a single entity, the illustrated image security management system 101 may represent a collection of functionalities, which can be instantiated as a single or multiple modules as desired (an instantiation of specific, multiple modules of the image security management system 101 is illustrated in FIG. 3). It is to be understood that the modules of the image security management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the image security management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In different embodiments, the image security management system 101 may be registered with the data access management system 109. Additionally, the image security management system 101 can be in the form of functionality provided by an application running on a computing device, which in turn can, but need not be, a more comprehensive security application. It is to be understood that although the image security management system 101 is illustrated in FIG. 3 as a single entity, the image security management system 101 represents a collection of functionalities, which can be instantiated as a single or multiple modules as desired.

In some embodiments, the identifier definition module 307, the receiving module 309, object identification module 311, object analysis module 313, classification module 315, and/or security action module 317 may be implemented as software, hardware, or a combination of these. In some embodiments, the receiving module 309, object identification module 311, object analysis module 313, text recognition module 315, classification module 315, and/or security action module 317 may be communicatively coupled by the bus 212 and/or the processor(s) 214 to one another and/or the other components of the computer system 210. In some embodiments, one or more of the components 309, 311, 313, 315, and 317 are sets of instructions executable by the processor(s) 214. In further embodiments, one or more of the components 309, 311, 313, 315, and 317 are storable in the memory(ies) 217 and are accessible and executable by the processor(s) 214. In any of the foregoing embodiments, these components 309, 311, 313, 315, and 317 may be adapted for cooperation and communication with the processor(s) 214 and other components of the computer system 210.

In some embodiments, the receiving module 309, object identification module 311, object analysis module 313, text recognition module 315, classification module 315, and/or security action module 317 may include computer logic operable to perform the operations described in further detail throughout this specification, for example, in reference to FIGS. 4 through 8. For example, the identifier definition module 307 may be programmed to define an image data identifier and a data identifier validator; the receiving module 309 may be programmed to receive an image; the object identification module 311 may be programmed to identify objects in the image based on attributes of the objects and may be communicatively coupled to the receiving module 309; and the object analysis module 313 may be programmed to determine an object type of an object and may be communicatively coupled to or integrated with the object identification module 311. The classification module 315 may be programmed to determine whether the object type matches a prohibited object type; in response to determining that the object type matches a prohibited object type, determine whether an object sub-type matches a prohibited object sub-type; in response to determining that the object sub-type matches a prohibited object sub-type, classify the object as prohibited; and may be communicatively coupled to the object analysis module 313 and the identifier definition module 307. In some embodiments, the classification module 315 may be programmed to, in response to determining that the object type does not match a prohibited object type or that the object sub-type does not match a prohibited object sub-type, classify the object as allowed. The security action module 317 may be programmed to perform an action in response to the image containing one or more object with sensitive information (e.g., that violate defined security policy, rules, or data security conditions), such as automatically blocking the image from being electronically transferred in response to the object being classified as prohibited, or automatically transmitting an electronic message to an administrator in response to the object being classified as prohibited.

Figure 4:
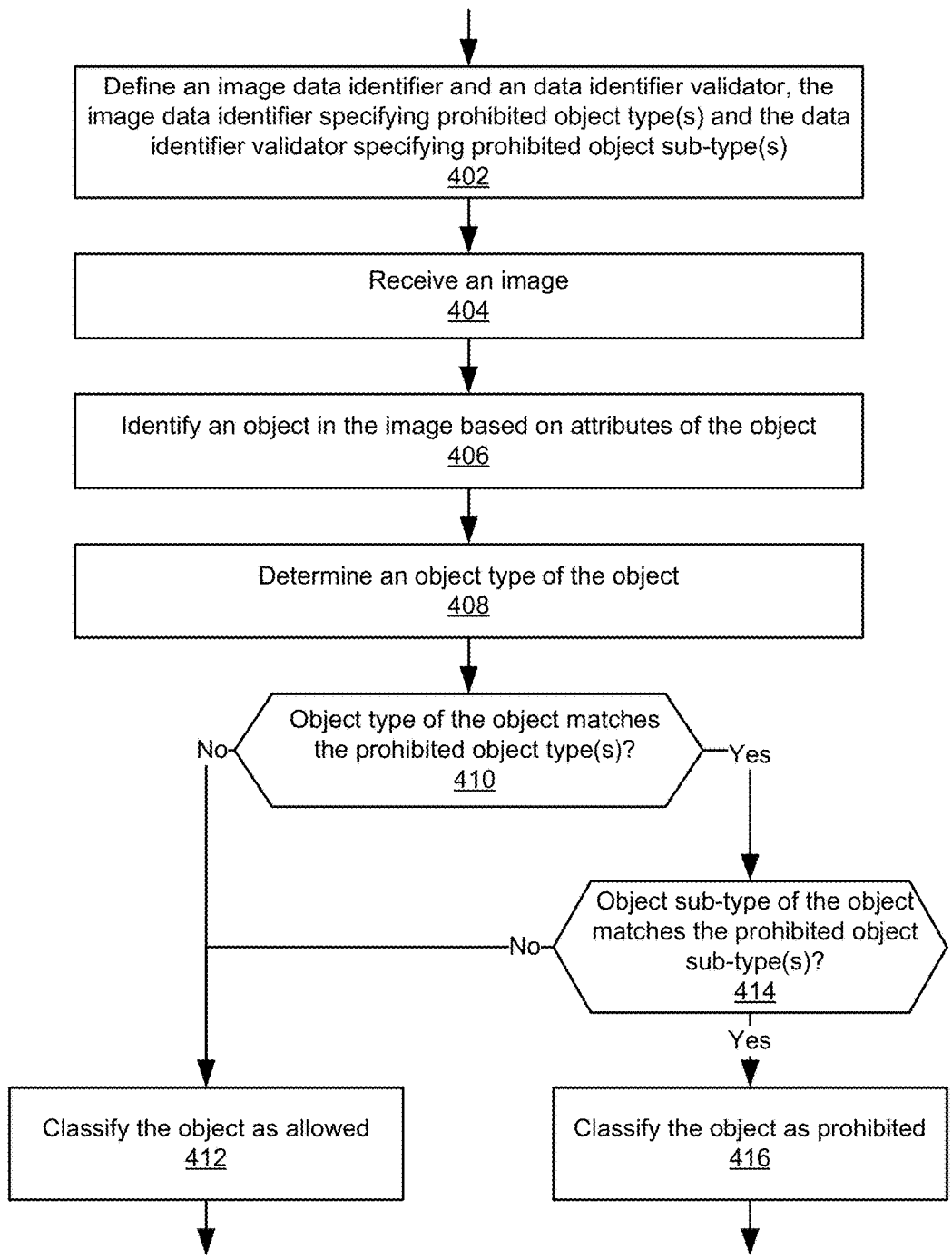
FIG. 4 is a flowchart of an example method for data loss prevention in an image-specific domain using image data identifiers and validators, according to some embodiments.

FIG. 4 is a flowchart of an example method for data loss prevention in an image-specific domain using image data identifiers and validators, according to some embodiments. At 402, the identifier definition module 307 may define an image data identifier and, in some embodiments, a data identifier validator. As described above, the image data identifier may specify one or more prohibited object types and the data identifier validator may specify one or more prohibited object sub-types. As described in further detail above, the image data identifier may be part of a data security condition that specifies whether a particular object type is prohibited or allowed, or may be part of a more complex rule (e.g., with a level of confidence in the object type, multiple objects in the same image, etc., as described elsewhere herein).

At 404, the receiving module 309 receives an image. The receiving module 309 may receive an image, for example, as a database is scanned, as a user accesses or attempts to transfer an image, etc. In some embodiments, the receiving module 309, or another security scanning module (not shown) coupled to the receiving module 309, may be configured to run scans on local or remote data stores. For example, the image security management system 101 may crawl a data store (e.g., a database, hard drive, etc.) on a local, virtual, or remote machine to scan all or a subset of documents on the data storage of the machine. For instance, the image security management system 101 may be configured to actively, periodically, or in response to some signal, scan a database for image files and analyze the image files according to the techniques described herein.

In some embodiments, the receiving module 309 may monitor interaction with data by the client 103. For example, an image may be received in response to an action, such as obtaining, opening, processing, or sharing of data by an application on the client 103. Monitoring can be implemented by the receiving module 309 or by a separate monitoring module or application (not shown). In some instances, the monitoring can be implemented by intercepting or otherwise hooking system calls that perform data access functionality, and wrapping them with code that executes the desired monitoring functionality. For example, calls that implement network communication can be intercepted, so as to detect and monitor data access and transmission of potentially sensitive data. Similarly, calls to access a file system (e.g., open, read, write, seek) can be intercepted, to detect and monitor client level interaction with local copies of data. Although these examples are provided, other embodiment mechanics for receiving and/or monitoring data (e.g., images) can be used in other embodiments.

At 406, the object identification module 311 identifies one or more objects in the image, based on attributes of the one or more objects. At 408, the object analysis module 313 determines an object type of one or more of the objects. In some embodiments, the object identification module 311 uses computer vision techniques (e.g., computer vision or machine learning techniques) to identify the presence and/or identity of objects in the image, such as specific attributes of an image that are associated with different types of objects. For example, the object identification module 311 may recognize an object in an image based on attributes such as colors, shapes, characters, patterns, etc. For example, as described in further detail in reference to FIG. 7, the object can include a bank check that may be recognized using attributes such as dimensions (e.g., a rectangular shape having a certain aspect ratio), Magnetic Ink Character Recognition (MICR) font, characters, or glyphs, presence of horizontal lines down the center of the check, or other attributes of checks. In another example, the object may include a photo identification card (e.g., a driver license, student ID), as described in further detail in reference to FIGS. 5, 6, and 8, that can be recognized using attributes such as object dimensions or aspect ratio, an image of a face (e.g., based on facial recognition or a face detection algorithm) at a given location of the object, particular colors, symbols, barcodes (e.g., 1 dimensional, 2 dimensional, etc.), or layouts common to photo identification cards, etc. It is to be understood that the specific attributes used to identify different object types can vary between object type and embodiments, as desired.

In some embodiments, the object identification module 311 may have identified multiple objects in a single image, in which instance, the object analysis module 313 may analyze the objects either separately, or as a group. For example, the object analysis module 313 may first determine an object type of a first object in the image and then determine an object type of a second object in the image.

The operations at 408 may be combined with the operations at 406. For example, an object may be identified using particular attributes common to that type of object, such as a MICR character at the bottom of the object (e.g., for a check) or an image of a face along the left or right side of a card shaped object (e.g., for a driver license). The object/object type identification does not require that the all or parts of the object or image be analyzed or transcribed into text (e.g., as with OCR). For instance, it is not necessary to look for account numbers, routing numbers, etc., because the object type itself is the defined by data security condition, according to some embodiments of the techniques described herein.

At 410, the classification module 315 may determine whether the object type of the object matches at least one prohibited object type(s). In some embodiments, determining whether the object type of the object matches at least one prohibited object type(s) may include determining a level of confidence that the object type of the identified object matches at least one prohibited object type and determining that the level of confidence that the object type of the object matches at least one prohibited object type satisfies a threshold level of confidence. Although other methods are possible and contemplated herein, the level of confidence may be computed automatically during image analysis, based on the number or percentage of expected attributes found in an image/object, or using other known probability determination methods.

In some embodiments, determining whether an object sub-type matches at least one prohibited object sub-type (e.g., at 414) may be further in response to determining that a level of confidence that the object type matches a prohibited object type does not satisfy a threshold level of confidence. For example, a data security condition may define that in order to satisfy the data security condition, a level of confidence (e.g., that an object type does or, in some instances, does not match a prohibited object type) is at least a first threshold probability (e.g., 70% probability) and that if the level of confidence is between a second and the first threshold (e.g., 50% and 70% probability), the object type may be verified by performing further image analysis. For example, in order to reduce false positives (or, in some instances, false negatives), the classification module 315 may proceed to 414 to determine if one or more object sub-types matches at least one prohibited object sub-type. In some embodiments, the classification module 315 may verify the object type by checking whether an object sub-type of the object matches any of the object sub-types corresponding to the object type. For example, if the level of confidence is not sufficient to confirm that the object type of the object is a driver license, then the classification module 315 (or the image analysis module 313) may determine whether an object sub-type of the object matches any state/sub-type (e.g., based on certain driver license attributes common or unique to states, such as a state logo, graphic, barcode, etc.). It should be noted that these thresholds are provided only as examples and that the threshold(s) can be defined based on image analysis algorithm accuracy, computational performance considerations, security policies, or administrator preferences.

In some embodiments, the classification module 315 may determine that the object type of the first object violates a data security condition (e.g., from 410, the process may continue to 412 or 416 without performing the operations at 414). For example, it may be determined that the object is a check and that any check (e.g., a particular object type) constitutes prohibited/secure information under a defined security policy. Accordingly, the image security management system 101 may determine that the image contains prohibited, sensitive information without continuing to perform the operations at 414 or other analysis.

At 412, in response to determining that the object type of the object does not match at least one prohibited object type, then the classification module 315 may classify the object as allowed. In some embodiments, in response to determining that the object sub-type of the object does not match at least one prohibited object sub-type, then the classification module 315 may classify the object as allowed. For example, if a data identifier validator does not indicate to check for an object sub-type (e.g., for increased granularity or level of confidence validation), then the process may classify the object as allowed without further image analysis, thereby reducing consumption of computational resources. Accordingly, the amount of processing performed is a function of the number and granularity of object type(s) and/or object sub-type(s).

At 414, in response to determining that the object type of the identified object matches at least one prohibited object type(s), the classification module 315 may determine whether an object sub-type of the object matches at least one prohibited object sub-type(s). In some embodiments, the classification module 315 (and/or object analysis module 313) may use image analysis techniques, as described herein in reference to identifying the object type, to identify the object sub-type.

In some embodiments, the classification module 315 may use the determined object type to focus the image analysis to determine the object sub-type. For instance, if looking for a California driver license, once the classification module 315 has determined that the image includes a driver license (e.g., based on attributes common to driver licenses), the classification module 315 may analyze the particular attributes that it expects to be on a California license (e.g., a particular layout, a particular color, a particular logo, a combination thereof, etc.).

In some embodiments, the classification module 315 may use a textual data identifier validator, for instance, to provide further granularity or reduce false positives or false negatives (e.g., in response to a determined level of confidence relative to a threshold). For example, the image security management system 101 may use the techniques described in U.S. patent application Ser. No. 15/419,756 titled "Structured Text and Pattern Matching for Data Loss Prevention in Object-Specific Image Domain," which is incorporated herein by reference.

At 416, in response to the determining that the object sub-type of the identified object matches a prohibited object sub-type, the classification module 315 may classify the first object as prohibited (e.g., in violation of a data security condition).

It should be noted that the object type and/or sub-type can be determined at any level of granularity and, that the above process can be extended to object sub-sub-types. For example, in some embodiments, the object type, sub-type, etc., can be determined at low level of granularity (e.g., any photo identification card), an intermediate level of granularity (e.g., specifically a driver license), or a high level of granularity (e.g., only driver licenses from Texas).

In some embodiments, an administrator may define a data security condition that states that if two objects of particular object types are contained in the same image (or even in separate images in the same document, file, or e-mail, etc.), then the image contains sensitive information in violation of the data security condition. For example, if the object analysis module 313 determines that the image contains an object of a first object type (e.g., a social security card) and a second object of a second object type (e.g., a driver license), it may be determined that the image contains sensitive information. For instance, it may be determined that the image contains prohibited/sensitive information responsive to the object type of the first object being a first particular type and the object of the second object being a second particular object type.

In some embodiments, in response to an unauthorized access, transfer, etc., of sensitive information (e.g., an image containing sensitive information), a security action module 317 may take an action based on an image/object that is being transferred, accessed, etc., containing sensitive information. For example, the security action module 317 may automatically block the image from being electronically transferred in response to an object or image being classified as prohibited. Additionally or alternatively, the security action module 317 may automatically transmit an electronic message (e.g., an e-mail, push notification, short text message, etc.) to a computing device of an administrator in response to object or image being classified as prohibited.

Figure 5:
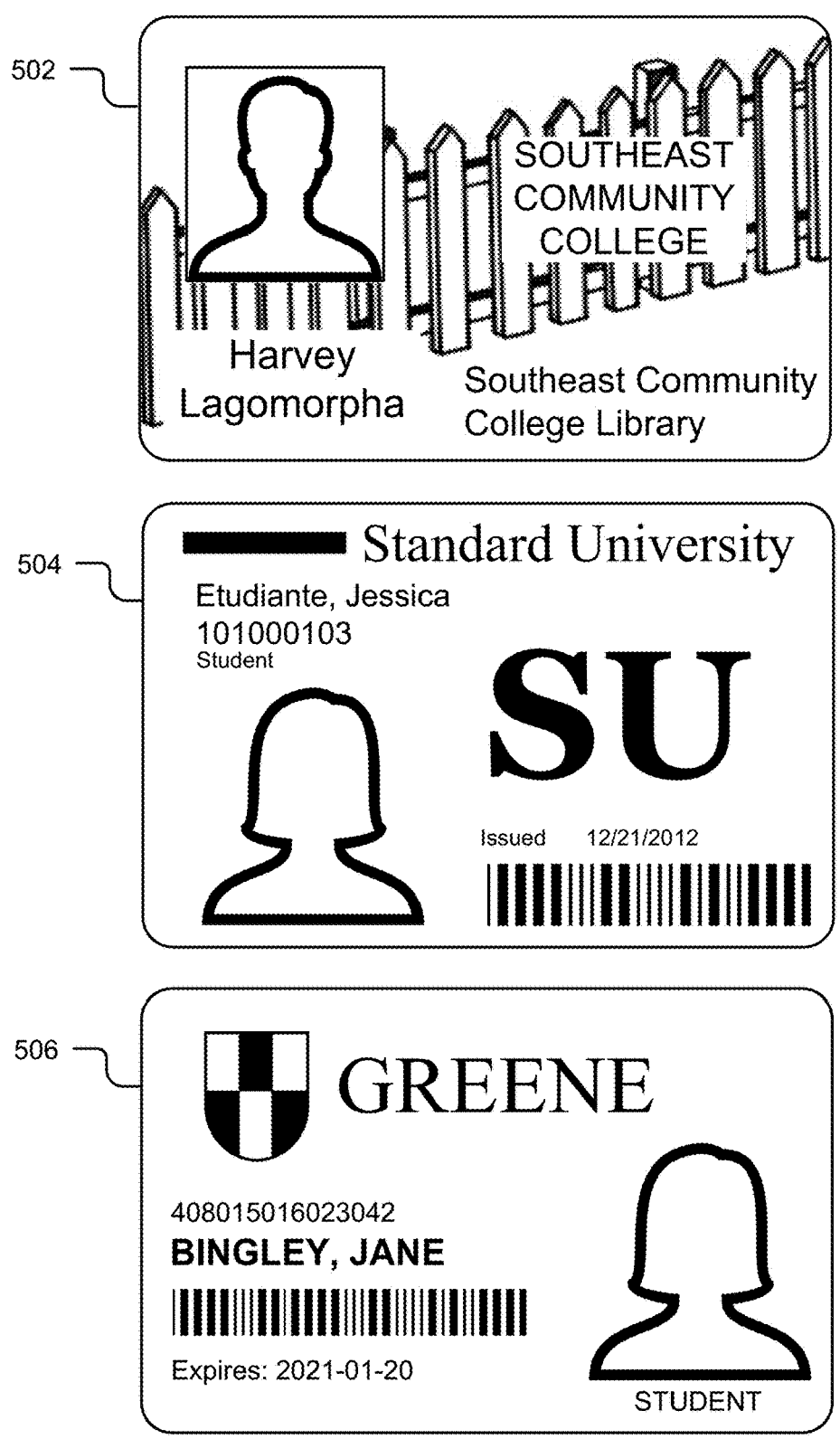
FIGS. 5, 6, 7, and 8 are illustrations of example objects that may be analyzed for sensitive information, according to some embodiments.

FIG. 5 is an illustration of example student IDs 502, 504, and 506 that may be contained in an image being analyzed for sensitive information, according to some embodiments. The student IDs illustrated in FIG. 5 illustrate how the techniques described herein can be used to identify objects belonging to the same object type and/or object sub-type despite differences in attributes (layout, color, textual, etc., differences). For example, the image data identifier can be used to define an object type that cannot be described in a text-based data identifier. For instance, in the student IDs 502, 504, and 506, there is no common text (accordingly a text matching rule would not function or would not be accurate) and, in some instances, there may not be a common layout, pattern, or template that works for all student IDs. For example, optical character recognition (OCR) would overlook a lot of components of images, such as faces, logos, graphics, etc., while not having sufficient common text to identify the object type. However, the image data identifier allows object types to be abstracted into a descriptor and, using computer vision it can be inferred that a particular object type is in the image.

In the example of student IDs, the object type (e.g., student ID) can be identified using attributes, such as, object aspect ratio, presence of a picture of a face, logo(s), a barcode, a face at a certain location, certain layouts. In some embodiments, the more attributes expected to be contained on an object with a particular object type, the higher the level of confidence that the object type is a particular object type.

Figure 6:
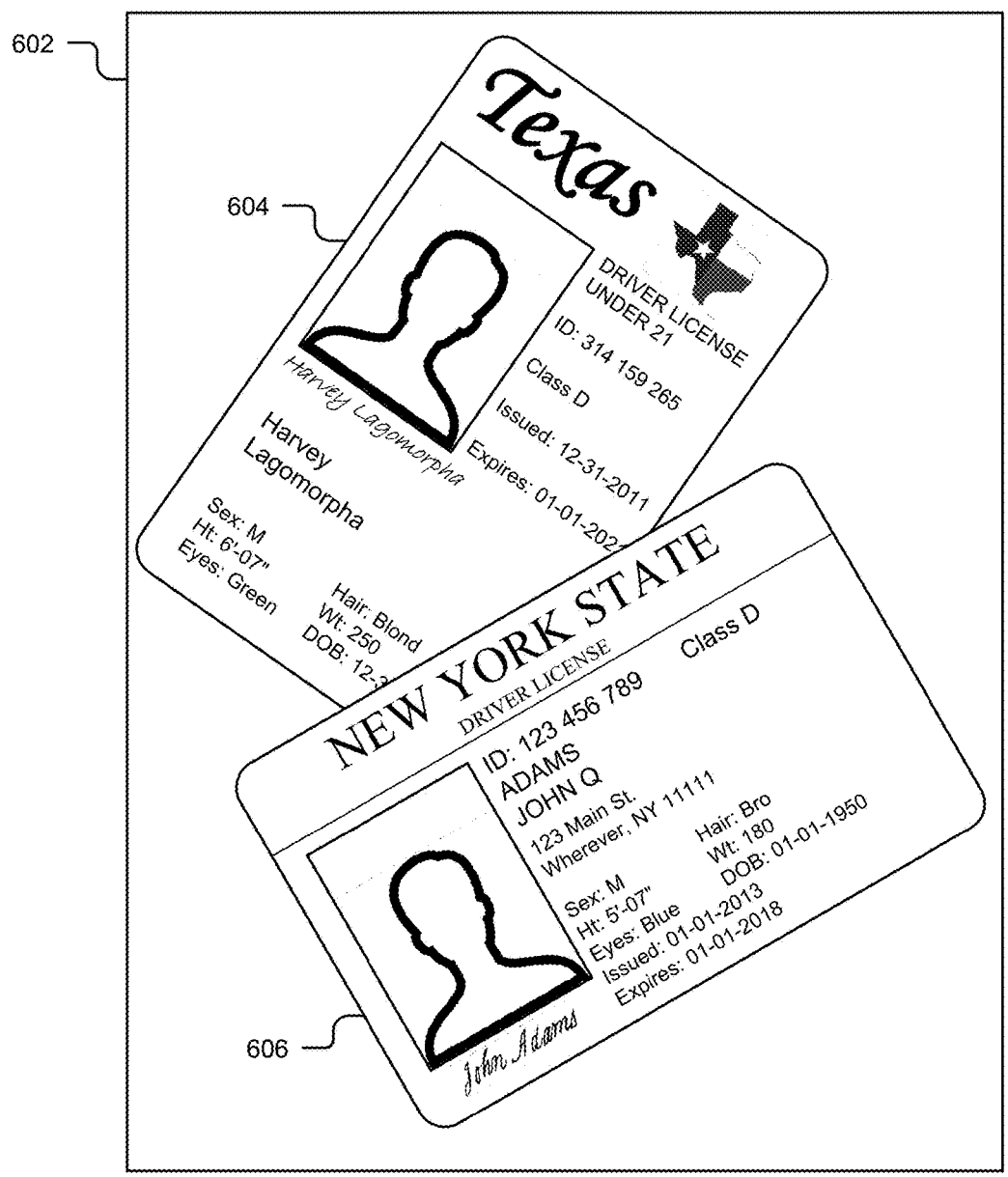

FIG. 6 is an illustration of an image 602 containing two objects—a first driver license 604 and a second driver license 606—that may be analyzed for sensitive information, according to some embodiments. As illustrated in FIG. 6, the image security management system 101 may identify object types of objects even if the objects are rotated in the image or partially obscured. For example, the image security management system 101 may use the boundaries, aspect ratios, etc., of the object to determine an object orientation to improve object type identification accuracy and may then use the attributes of the object to determine the object type (e.g., a photo identification card) and/or sub-type (e.g., issued by a particular state). In some embodiments, the attributes may include an image of a face, for example, at a defined location of the object. FIG. 6 also illustrates an example where traditional OCR engines would fail as they cannot determine one dominant orientation angle due to the presence of two or more different objects each captured at an arbitrary angle.

The image security management system 101 may independently determine whether each object contains sensitive information. For example, if the image security management system 101 determines that the object type of the object 604 is not a prohibited object type, it may continue to determine whether the object type of the object 606 matches a prohibited object type, according to the techniques described herein.

In some embodiments, a prohibited object type may comprise a driver license and a prohibited object sub-type may comprise a particular driver license issuing jurisdiction. Accordingly, the image security management system 101 may determine that the objects 604 and 606 each include a driver license and then may determine whether one of the objects 604 and 606 include a prohibited object sub-type, such as a driver license from Texas. For example, upon determining that the image 602 contains a prohibited object sub-type, the image security management system 101 may classify the object 604 and/or the image 602 as prohibited.

Figure 7:
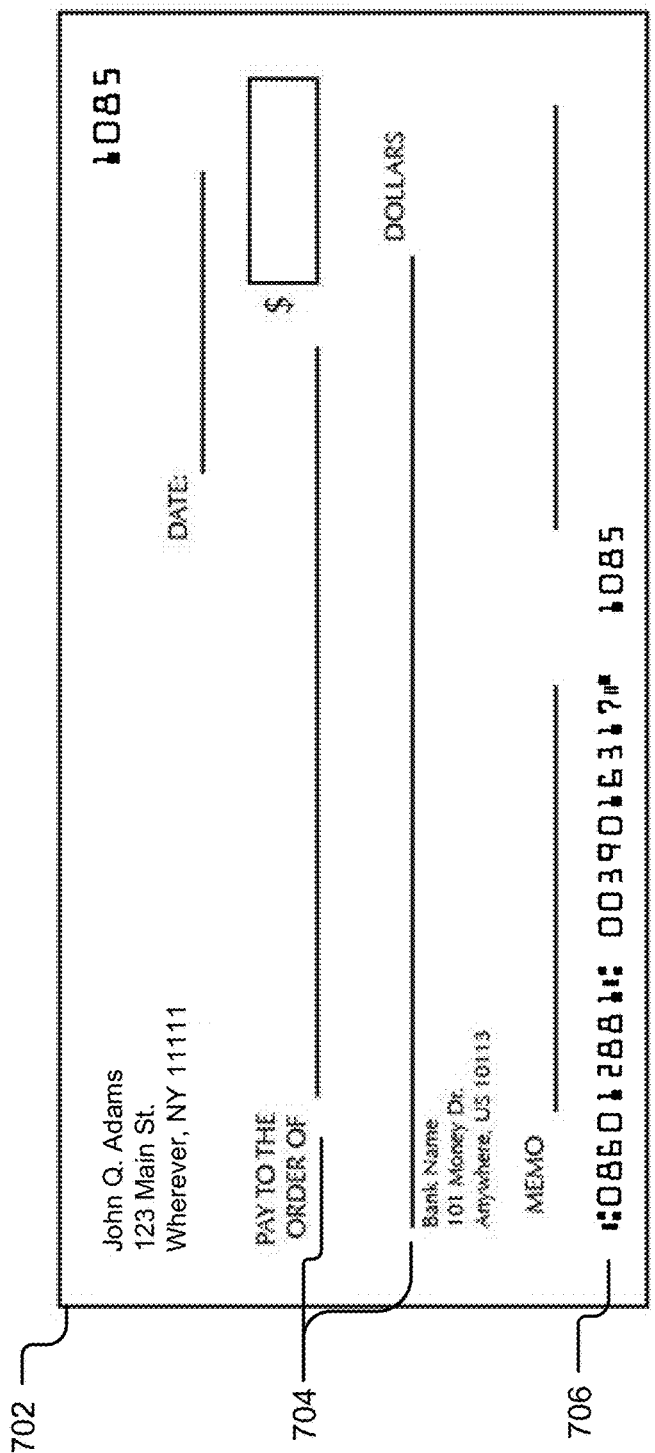

FIG. 7 is an illustration of an example check 702 that may be contained in an image being analyzed for sensitive information, according to some embodiments. Given an image containing a check 702, the object identification module 311 and object analysis module 313 can use computer vision techniques to detect the check (e.g., based on dimensions, shape, layout, presence of graphical elements, fonts, or MICR characters).

In some embodiments, the image security management system 101 may use attributes, such as the lines at 704 or the MICR number font and MICR glyphs shown at 706 to identify the object 702 as the a check (e.g., a particular object type). In some embodiments, the image security management system 101 may further identify the object sub-type (e.g., from a certain bank, a certain type of check), based on the aspect ratio, coloring, security features, logos, etc., of a check.

The techniques described herein can recognize objects in challenging situations and are highly efficient. The image security management system 101 may find sensitive information in images taken by uncooperative users (e.g., with resulting poor image quality), and may scan many (e.g., hundreds, thousands, millions) of images within a certain time. In some instances, most of the images scanned may not contain sensitive information, so the images that do not violate security policies should be passed as rapidly as possible and with few to no false negatives. For example, the image security management system 101 may be configured to be relatively conservative in thresholds of confidence with which images are analyzed to have sensitive information in violation of security policies, but the image security management system 101 may also be configured to pass (e.g., classify as not containing sensitive information) images as rapidly and as early in the analysis as possible to decrease latency and demand on computational resources.

Figure 8:
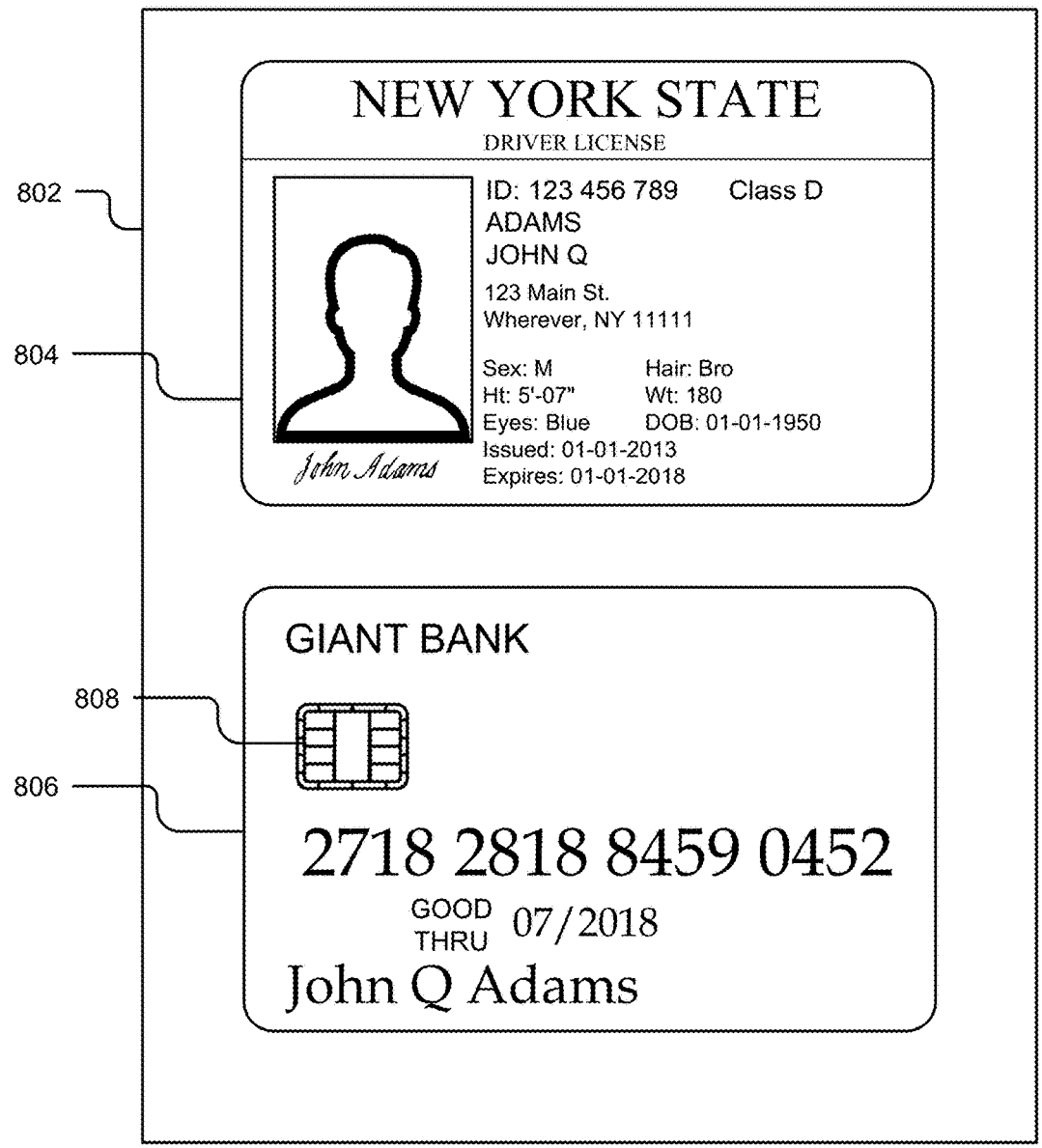

FIG. 8 is an illustration of an image 802 containing two objects—a driver license 804 and a credit card 806—that may be analyzed for sensitive information, according to some embodiments. The techniques described herein may be used to detect a photo identification card (e.g., driver license, student ID, passport, etc.). For example, the image security management system 101 may identify the presence of one or more driver licenses in an image by detecting the presence of unique features, such as a face, particular graphics (e.g., logos, colors, graphics, layouts, barcodes, quick response codes, etc., used by various states) and other features unique to a driver license. Once the object has been identified, it may be determined whether that object corresponds to a prohibited object type (or multiple object types if multiple objects are in the image) and appropriate security operations may be performed, according to a security policy.

Similarly, the image security management system 101 may additionally or alternatively identify a credit card 806 in an image (e.g., based on the features of the credit card, such as a credit card number, card issuer logo, an EMV (Europay, MasterCard, Visa) chip 808, etc.).

In some embodiments, a data security condition may be defined to classify an image containing two or more objects of particular object types as prohibited in violation of the data security condition. For instance, the data security condition may state that any image containing an image of both a photo ID card (an object of a first object type) and a credit card (an object of a second object type) violates the data security condition. In some embodiments, the image security management system 101 may perform the same operations for the second object as for the first object (e.g., the operations described in reference to FIG. 4). For example, the image security management system 101 may determine that the image 802 contains sensitive information responsive to the object type of the first object being a first particular object type and the object type of the second object being a second, different particular object type.

In some embodiments, custom data security conditions can be defined to prohibit images with varying object types, for example, a rule can be defined to prohibit situations, such as, object type one OR object type two, object type one AND object type two, or object type one AND object type two within a certain distance of each other, etc.

For example, a data security condition may specify that in order to violate the data security condition two objects of particular object types must be within a certain number of pixels, number of inches (or other unit of measurement), percentage of image size, etc., within the image or even that the objects be in images within the same file, the only two objects in an image, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:
1. A computer-implemented method comprising:
defining, by a computing device, an image data identifier, the image data identifier specifying one or more prohibited object types;
defining, by the computing device, a data identifier validator, the data identifier validator specifying one or more prohibited object sub-types;
receiving, by the computing device, an image;
determining, by the computing device, one or more attributes of the image;
identifying, by the computing device, one or more objects in the image based on the one or more attributes of the image;
determining, by the computing device, an object type of a first object of the one or more objects using the one or more attributes of the image;
determining, by the computing device, whether the object type of the first object matches at least one of the one or more prohibited object types;
based on determining that the object type of the first object matches at least one of the one or more prohibited object types, determining, by the computing device, whether an object sub-type of the first object matches at least one of the one or more prohibited object sub-types; and based on determining that the object sub-type of the first object matches the prohibited object sub-type, classifying, by the computing device, the first object as prohibited.

2. The computer-implemented method of claim 1, further comprising:
in response to determining that the object type of the first object does not match at least one of the one or more prohibited object types or that the object sub-type of the first object does not match at least one of the one or more prohibited object sub-types, classifying, by the computing device, the first object as allowed.

3. The computer-implemented method of claim 1, wherein determining whether the object type of the first object matches at least one of the one or more prohibited object types comprises:
determining, by the computing device, a level of confidence that the object type of the first object matches at least one of the one or more prohibited object types; and
determining, by the computing device, whether the level of confidence that the object type of the first object matches at least one of the one or more prohibited object types satisfies a threshold level of confidence.

4. The computer-implemented method of claim 1, wherein determining, by the computing device, whether an object sub-type matches at least one of the one or more prohibited object sub-types is further in response to determining that a level of confidence that the object type of the first object matches at least one of the one or more prohibited object types does not satisfy a threshold level of confidence.

5. The computer-implemented method of claim 1, further comprising:
determining, by the computing device, an object type of a second object of the one or more objects;
determining, by the computing device, whether the object type of the second object matches at least one of the one or more prohibited object types;
in response to determining that the object type of the second object matches at least one of the one or more prohibited object types, determining, by the computing device, whether an object sub-type of the second object matches at least one of the one or more prohibited object sub-types; and
in response to determining that the object sub-type of the second object matches the prohibited object sub-type, classifying, by the computing device, the second object as prohibited.

6. The computer-implemented method of claim 5, further comprising:
determining, by the computing device, that the image contains sensitive information based on the object type of the first object and the object type of the second object.

7. The computer-implemented method of claim 6, wherein it is determined that the image contains sensitive information responsive to the object type of the first object being a first particular object type and the object type of the second object being a second, different particular object type.

8. The computer-implemented method of claim 5, further comprising:
determining, by the computing device, that the image contains sensitive information based on the object sub-type of the first object and the object sub-type of the second object.

9. The computer-implemented method of claim 1, further comprising:
automatically blocking the image from being electronically transferred in response to the first object being classified as prohibited.

10. The computer-implemented method of claim 1, further comprising:
automatically transmitting an electronic message to an administrator in response to the first object being classified as prohibited.

11. The computer-implemented method of claim 1, wherein the one or more attributes of the image comprise dimensions of the first object.

12. The computer-implemented method of claim 1, wherein the one or more attributes of the image comprise MICR (Magnetic Ink Character Recognition) characters.

13. The computer-implemented method of claim 1, wherein the one or more attributes of the image comprise an image of a face.

14. The computer-implemented method of claim 13, wherein the one or more attributes of the image comprise the image of the face at a defined location on the first object.

15. The computer-implemented method of claim 14, wherein the object type of the first object comprises a photo identification card.

16. The computer-implemented method of claim 1, wherein the one or more prohibited object types comprise a driver license and the one or more prohibited object sub-types comprise a particular driver license issuing jurisdiction.

17. A computer readable medium storing instructions that, when executed by a computing device having one or more processors, causes the one or more processors to perform operations comprising:
defining, by the computing device, an image data identifier, the image data identifier specifying one or more prohibited object types;
defining, by the computing device, a data identifier validator, the data identifier validator specifying one or more prohibited object sub-types;
receiving, by the computing device, an image;
determining, by the computing device, one or more attributes of the image;
identifying, by the computing device, one or more objects in the image based on attributes of the image;
determining, by the computing device, an object type of a first object of the one or more objects using the one or more attributes of the image;
determining, by the computing device, whether the object type of the first object matches at least one of the one or more prohibited object types;
determining, by the computing device, whether an object sub-type of the first object matches at least one of the one or more prohibited object sub-types based on a determination that the object type of the first object matches the at least one of the one or more prohibited object types; and
in response to determining that the object sub-type of the first object matches the at least one of the one or more prohibited object sub-types, classifying, by the computing device, the first object as prohibited.

18. The computer readable medium of claim 17, wherein the operations further comprise:
in response to determining that the object type of the first object does not match at least one of the one or more prohibited object types or that the object sub-type of the first object does not match at least one of the one or more prohibited object sub-types, classifying, by the computing device, the first object as allowed.

19. A computer system comprising:
an identifier definition module programmed to define an image data identifier and a data identifier validator, the image data identifier specifying one or more prohibited object types, the data identifier validator specifying one or more prohibited object sub-types, at least one processor configured to execute the identifier definition module;
a receiving module programmed to receive an image, the at least one processor configured to execute the receiving module;
an object identification module programmed to determine one or more attributes of the image identify one or more objects in the image based on the one or more attributes of the image, the at least one processor configured to execute the object identification module, the object identification module communicatively coupled to the receiving module;
an object analysis module programmed to determine an object type of a first object of the one or more objects using the one or more attributes of the image, the at least one processor configured to execute the object analysis module, the object analysis module communicatively coupled to the object identification module; and
a classification module programmed to determine whether the object type of the first object matches at least one of the one or more prohibited object types, in response to determining that the object type of the first object matches at least one of the one or more prohibited object types, determine whether an object sub-type of the first object matches at least one of the one or more prohibited object sub-types, the object sub-type being determined based on the object type, and, in response to determining that the object sub-type of the first object matches the at least one of the one or more prohibited object sub-types, classify the first object as prohibited, the at least one processor configured to execute the classification module, the classification module communicatively coupled to the object analysis module and the identifier definition module.

20. The computer system of claim 19, wherein the classification module is further programmed to, in response to determining that the object type of the first object does not match at least one of the one or more prohibited object types or that the object sub-type of the first object does not match at least one of the one or more prohibited object sub-types, classify the first object as allowed.

* * * * *